M. Cziner's Impt in Treating Indian Corn.
No. 120,721.
Patented Nov. 7, 1871.
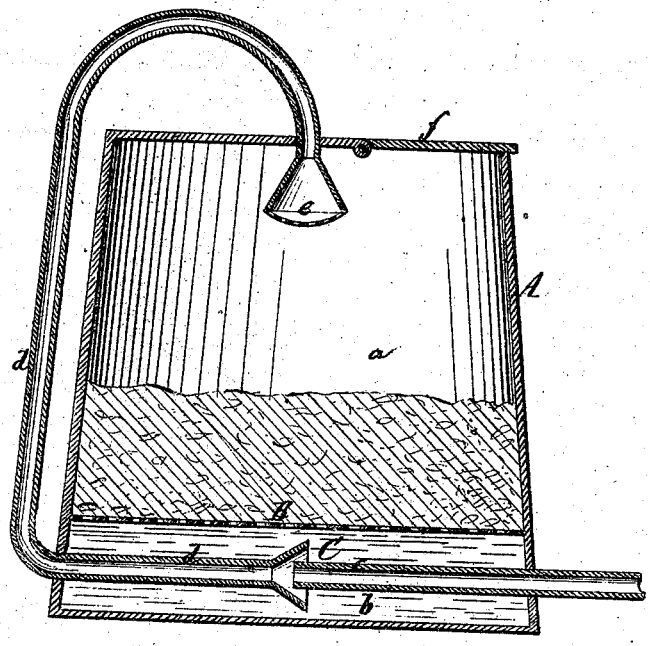
Witnesses:
E. F. Kastenhuber
C. Wahlers
Inventor:
Matjas Cziner

UNITED STATES PATENT OFFICE.

MATJAS CZINER, OF NEW YORK, N. Y.

IMPROVEMENT IN TREATING INDIAN CORN WITH MALT EXTRACT.

Specification forming part of Letters Patent No. 120,721, dated November 7, 1871.

*To all whom it may concern:*

Be it known that I, MATJAS CZINER, of the city, county, and State of New York, have invented a new and useful Improvement in Treating Indian Corn; and I do hereby declare the following to be a full, clear, and exact description thereof, which will enable those skilled in the art to make and use the same, reference being had to the accompanying drawing forming part of this specification, which drawing represents a vertical central section of the apparatus used in carrying out this invention.

This invention relates to a process for extracting the saccharine matter from Indian corn by the repeated application of a shower of extract of malt by means of an apparatus composed of a tun with a false perforated bottom and of an injector situated beneath the false bottom, and acting, in conjunction with a pipe connecting with a rose situated near the top of the tun, in such a manner that when the space below the perforated false bottom is filled with water, while the malt and corn are placed on the top of said false bottom, a current of steam admitted through the injector causes the water to circulate continually through the corn and malt, and the extract obtained from the malt is thus caused to act on the corn and to extract the saccharine matter therefrom in a rapid and expeditious manner.

In the drawing, A designates a tun constructed of wood or any other suitable material, and provided with a false perforated bottom, B, which divides the tun in two compartments, $a\ b$. In the lower compartment $b$ is situated an injector, C, composed of a steam-pipe, $c$, which terminates opposite the bell-shaped mouth of a pipe, $d$, as shown. This pipe extends up on the outside of the tun, and it connects with a rose, $e$, situated in the interior of said tun and near its top. The material to be extracted is introduced through a lid, $f$, which can be hermetically closed.

In treating Indian corn I proceed as follows: I first introduce a suitable quantity of malt in the upper compartment of the tun, while the lower compartment thereof is filled with water, and by admitting a current of steam through the pipe $c$ the water is forced up through the pipe $d$ and caused to trickle down on the malt through the rose $e$. In passing through the malt the water absorbs a quantity of the saccharine matter, and by carrying on the process for some time all or nearly all the saccharine matter contained in the malt is extracted. When this object has been accomplished I introduce in the tun a suitable quantity of Indian corn previously crushed, and by admitting steam to the injector the extract of malt which has collected in the bottom part of the tun is caused to percolate the corn, and by continuing the operation the saccharine matter contained in the corn is extracted. As the operation progresses the temperature in the interior of the tun increases gradually, the same liquid being made to pass repeatedly through the corn, and the process of extracting the corn is effected with great rapidity.

I disclaim everything shown and described in the patent of Prentiss and Parsons, No. 63,174, (1867;) but What I do claim, and desire to secure by Letters Patent, is—

Making extract from Indian corn by the combined action of a current of steam and of a liquid extract of malt, in the manner substantially as herein shown and described.

This specification signed by me this 27th day of March, 1871.

MATJAS CZINER.

Witnesses:
 W. HAUFF,
 E. F. KASTENHUBER. (19)